United States Patent
Geevarghese et al.

(10) Patent No.: US 6,813,273 B2
(45) Date of Patent: Nov. 2, 2004

(54) METHOD AND APPARATUS FOR DETERMINING EXISTENCE OF AN ADDRESS IN AN ADDRESS LOOK-UP TABLE

(75) Inventors: John Geevarghese, Kottayam (IN); Joy Chatterjee, Bangalore (IN)

(73) Assignee: Motorola, Inc., Schaumburg, IL (US)

( * ) Notice: Subject to any disclaimer, the term of this patent is extended or adjusted under 35 U.S.C. 154(b) by 868 days.

(21) Appl. No.: 09/766,515

(22) Filed: Jan. 19, 2001

(65) Prior Publication Data

US 2002/0126662 A1 Sep. 12, 2002

(51) Int. Cl.[7] .......................... H04L 12/28; H04L 12/66; G06F 15/177; G06F 15/173
(52) U.S. Cl. ................. 370/395.32; 370/389; 370/412; 370/400; 370/352; 709/222; 709/238
(58) Field of Search ................................ 370/389, 400, 370/390, 395.1, 395.32, 395.31, 395.2, 231, 229, 237, 412, 351, 352; 709/222, 220, 221, 238

(56) References Cited

U.S. PATENT DOCUMENTS

| | | | |
|---|---|---|---|
| 5,983,223 A | | 11/1999 | Perlman |
| 6,011,795 A | | 1/2000 | Varghese et al. |
| 6,564,211 B1 | * | 5/2003 | Andreev et al. ............... 707/3 |
| 6,628,653 B1 | * | 9/2003 | Salim ........................ 370/389 |
| 6,633,563 B1 | * | 10/2003 | Lin et al. .................... 370/389 |
| 6,636,516 B1 | * | 10/2003 | Yamano ................ 370/395.52 |
| 6,697,380 B1 | * | 2/2004 | Egbert et al. ............... 370/469 |

* cited by examiner

Primary Examiner—Hahn Nguyen

(57) ABSTRACT

A method (50) for determining if it is necessary to perform a search for a specified address in an address lookup table (LUT) (58) containing a plurality of addresses (59) is disclosed. The method (50) provides at least one ordered list (56) of address existence fields. The address existence fields are associated with lookup addresses obtained from at least one portion of the plurality of addresses (59). The method (50) indexes into the at least one ordered list (56) to access at least one address existence field associated with a corresponding portion of the specified address. The method (50) further checks the at least one address existence field to determine if a search of the specified address in the address LUT (58) is necessary.

14 Claims, 4 Drawing Sheets

METHOD AND APPARATUS FOR DETERMINING EXISTENCE OF AN ADDRESS IN AN ADDRESS LOOK-UP TABLE

FIELD OF THE INVENTION

This invention relates, in general, to a method and apparatus for routing data packets in packet networks, and more particularly, to a method and apparatus for determining if a search for a specified packet destination address in an address look-up table (LUT) is necessary before proceeding with the search.

BACKGROUND ART

The Internet has seen phenomenal growth over the last decade. Statistics show that the number of hosts on the Internet is doubling every six months. With the growing number of Internet applications, the traffic on the Internet has also grown tremendously. There is an ever-increasing demand for higher bandwidth on data links and for routers with higher throughput on the Internet. New applications such as firewalls, virtual private networks (VPN), quality-of-service (QOS) routing etc. have been implemented on the routers and these applications have also added to the processing load of the routers.

Address lookup continues to be a major task on a router, accounting for most of the CPU usage time on the router. Methods such as those disclosed in U.S. Pat. Nos. 5,983,223 and 6,011,795, have been developed to increase the efficiency of address search algorithms on routers. Although these methods show a increase in efficiency in searching, it is suspected that they will not be able to keep pace with the increase in demand for higher throughput in a router in an efficient and cost effective manner. The popularity of even more recent Internet features such as flow-based resource reservation and data encryption will further add to the already heavy processing load of the routers.

Other methods used to speed up address lookups such as using content addressable memories (CAM) and caching have also proved to be inadequate and expensive.

SUMMARY OF THE INVENTION

According to one aspect of the invention there is provided a method for determining if it is necessary to perform a search for a specified address in an address lookup table (LUT) containing a plurality of addresses. Said method provides at least one ordered list of address existence fields associated with lookup addresses obtained from at least one portion of said plurality of addresses. Said method indexes into said at least one ordered list to access at least one address existence field associated with a corresponding portion of said specified address. Said method further checks said at least one address existence field to determine if a search of said specified address in said address LUT is necessary.

Suitably, said at least one portion of said plurality of addresses may include all components of said addresses.

Preferably, said at least one portion of said plurality of addresses may include a masked portion of said addresses.

Preferably, said masked portion of said addresses may include a prefix portion of said addresses.

Preferably, said method provides at least one ordered list by determining a and a largest lookup address of lookup addresses that define limits of a range of lookup addresses, allocating address existence fields for a predetermined number of said lookup addresses in said range, and initializing address existence fields corresponding to said range of lookup addresses to indicate existence of corresponding addresses in said address LUT. In such a case, indexing into said at least one ordered list preferably includes indexing into said at least one ordered list if said specified address has a corresponding address portion in said range.

Preferably, allocating address existence fields may include allocating address existence fields for discrete lookup addresses in said range.

Suitably, allocating address existence fields should include allocating address existence fields for a selected subset of said lookup addresses in said range.

Preferably, said selected subset of lookup addresses in said range may include lookup addresses that have a difference with the smallest lookup address that is divisible by a greatest common divisor obtained from differences between consecutive pairs of sorted lookup addresses.

Suitably, said allocating address existence fields may include allocating a predetermined number of address existence fields and hashing lookup addresses in said set of lookup addresses to said predetermined number of address existence fields.

Preferably, said at least one portion of said addresses should include a masked portion of said addresses.

Suitably, said masked portion of said addresses may include a first prefix portion and wherein providing at least one ordered list includes providing a first ordered list associated with a first set of prefixed addresses.

Suitably, providing at least one ordered list may further include providing a second ordered list associated with addresses masked with a second mask.

Preferably, said second mask should be non-overlapping with said first prefix portion and indexing into said at least one ordered list should include first indexing into said first ordered list and subsequently indexing into said second ordered list if an address existence field obtained from said first ordered list indicates further indexing is necessary. Preferably, checking said at least one address existence field should include checking address existence fields obtained from both said first and second ordered list and said method should further include proceeding with a search of said specified address in said address LUT if obtained address existence fields indicates that a search is necessary.

Suitably, said predetermined number of address existence fields is adjustable.

According to another aspect of the invention there is provided a program storage device readable by a processor, tangibly embodying a program of instructions, executable by said processor to perform the above method.

According to yet another aspect of the invention there is provided a computing node having a processor and a memory operatively coupled to said processor. Said processor executes program instructions stored in said memory in response to an arrival of a packet with a specified address at the computing node for determining if it is necessary to perform a search for said specified address in an address lookup table (LUT) containing a plurality of addresses in said memory according to the above method.

BRIEF DESCRIPTION OF THE DRAWINGS

In order that the invention may be readily understood and put into practical effect, reference will now be made to preferred embodiments as illustrated with reference to the accompanying drawings in which.

DETAILED DESCRIPTION OF PREFERRED EMBODIMENTS OF THE INVENTION

Figure 1:
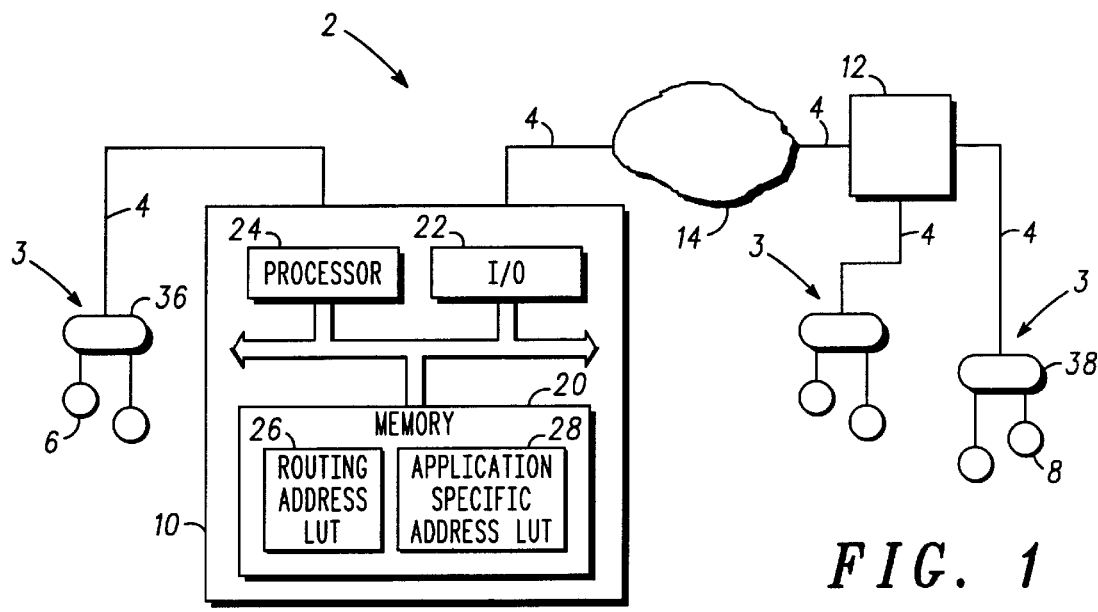
FIG. 1 is a block diagram of a computer network that includes routers for facilitating flow of data packets throughout the network.

FIG. 1 is a block diagram of a computer network 2 including subnetworks 3 connected by a collection of communication links 4. Connected to the subnetworks 3 is a plurality of computing nodes. The nodes are typically computers which include a source node 6, a destination node 8 and intermediate nodes or routers 10, 12. The subnetworks 3 are typically local area networks (LANs) interconnected by the routers 10, 12.

The subnetworks 3 may be connected to a wide area network 14 via communication links 4. The nodes, for example the source node 6 and the destination node 8, communicate by exchanging discrete data packets among the nodes. The routers 10, 12 facilitate the flow of these packets throughout the network 2 by routing them to their correct destination nodes.

The role and expected performance of the routers 10, 12 vary depending on the network 2 to which they are connected. There are mainly two types of routers, backbone routers and enterprise routers. Backbone routers have a routing address LUT with typically up to 40,000–50,000 address entries. Enterprise routers have comparatively less entries in their routing address LUTs, typically ranging from 1000–2000 entries.

In addition to routing data packets, the routers 10,12 run software applications such as applications for firewall checking, quality-of-service (QOS) routing and policy forwarding. These applications generally have associated application-specific address LUTs.

Each router 10, 12 typically includes a memory 20 and an input/output (I/O) adapter 22 operatively coupled to a processor 24. The memory 20 may function as a program storage device for storing program instructions and data structures that are readable by the processor 24 for directing the operation of the routers 10, 12. The memory 20 includes a routing address LUT 26 and application-specific address LUTs 28. The routing address LUT 26 stores routing information and parameters. The application-specific address LUTs 28 contain information relating to application-specific operations to be performed for each entry in the application-specific address LUTs 28. Each of these address LUTs 26, 28 generally contains information relating to a default operation to be performed when an address does not match entries in a particular address LUT. A disk (not shown) may alternatively be coupled to the I/O adapter 22 and configured to store the address LUTs 26, 28.

In general, when the source node 6 transmits a packet over a LAN, such as LAN 36, the packet is sent to all nodes on that LAN 36. If the intended recipient of the packet is connected to another LAN, such as LAN 38, the packet is routed through routers 10, 12 to the LAN 38. Typically, the packet contains a source node address and a destination node address. The routers 10, 12 route the packet to a destination node based on the destination node address in the packet and the information in the routing address LUT 26.

One of the functions of the routers 10,12 is determining the node or next hop to which the packet is sent. A network layer of a conventional protocol stack within each node preferably performs this routing function. This aspect of the network layer concerns the algorithms and protocols used by routers 10, 12 when cooperating to determine packet routes through the network 2. The routers 10, 12 execute these routing algorithms to decide which communication links 4 packets arriving at the routers 10, 12 should be forwarded. Each router 10, 12 maintains a routing address LUT 26 with entries indicating where to forward packets.

Typically, the routing address LUT 26 of each router 10, 12 is implemented as a tree data structure that stores destination node address prefixes. The destination node address prefix is a portion of the destination node address used to make next hop determinations. These determinations are preferably based on a longest-matching-address-prefix ("longest match") algorithm that is used to search the tree data structure for an entry corresponding to a specified destination node address prefix.

In running of applications such as QOS routing and firewall checking, etc., the routers 10,12 are required to determine if a specified address or address prefix exists in the corresponding application-specific address LUTs 28. These application-specific address LUTs 28 may be similarly implemented as the routing address LUT 26 or by other means known to those skilled in the art. It is to be appreciated that the routing address LUT 26 and the application-specific address LUTs 28 may be implemented as a single address LUT. These address LUTs 26, 28 may contain a large number of entries and a search of any address LUT 26, 28, is processor intensive. A search will result either in a hit or a miss. It is desirable to reduce the number of searches that will result in misses. Hereafter, both the routing and application-specific address LUTs 26, 28 will be commonly referred to as an address LUT.

Figure 2:
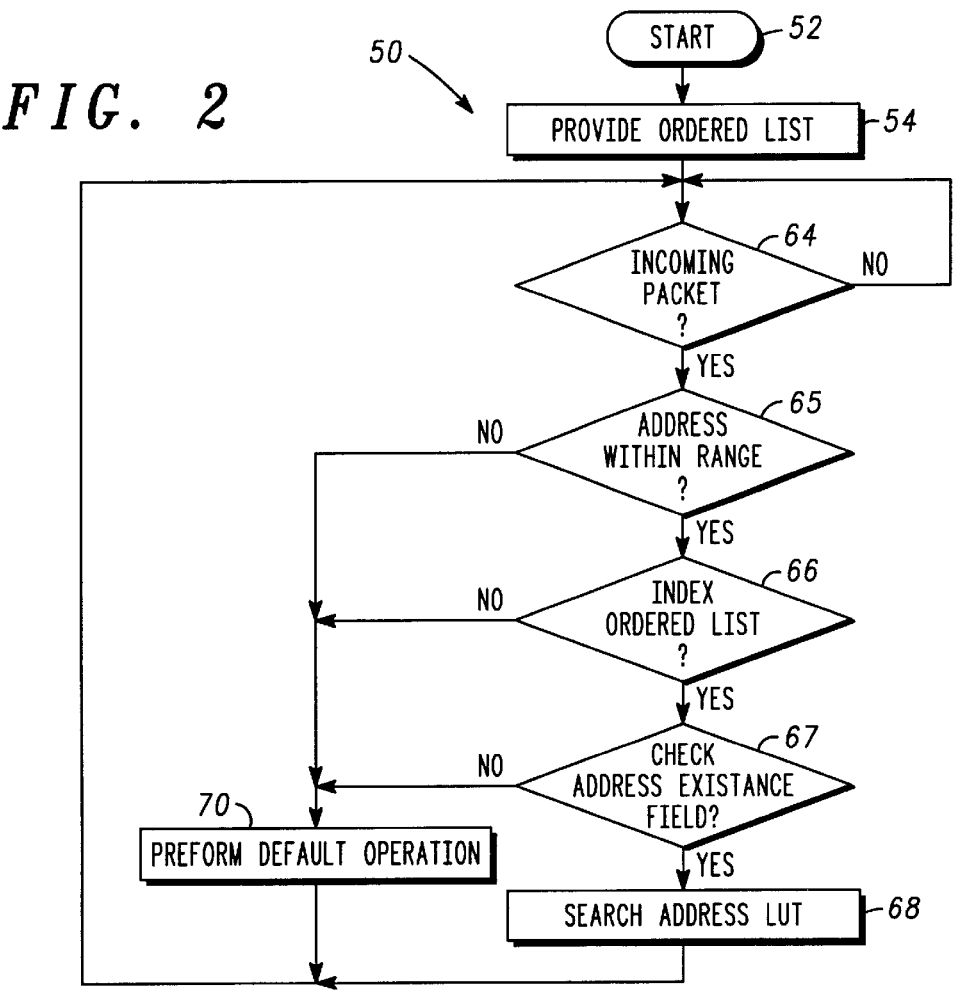
FIG. 2 is a flow diagram describing a sequence of steps suitable for implementation in a router in FIG. 1 for determining if a search in an address lookup table (LUT) is necessary before actually proceeding with the search.

FIG. 2 is a sequence 50 of steps for determining if it is necessary to perform a search for a specified address in the address LUT. The sequence 50 filters out searches in the address LUT that would result in misses. The sequence 50 is implemented in the router 10, 12.

Figure 3:
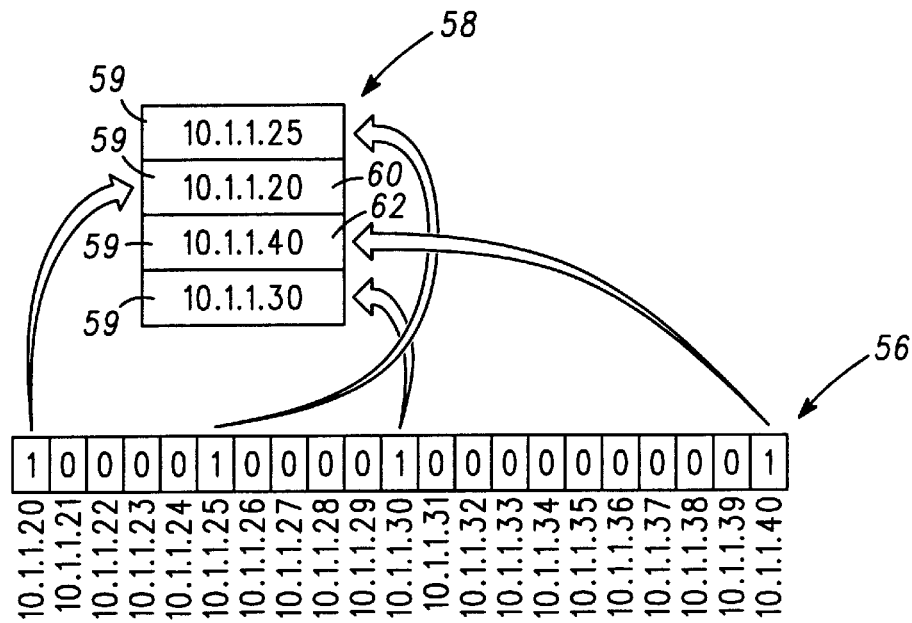
FIG. 3 is an illustration showing address existence fields provided for addresses in an address lookup table according to a first embodiment of the invention.

The sequence 50 starts in a START step 52, when a plurality of Internet addresses are provided in an address LUT on the router 10, 12. The sequence 50 next proceeds to a PROVIDE ORDERED LIST step 54, where an ordered list of address existence fields corresponding to the plurality of addresses is provided. FIG. 3 shows an ordered list 56 according to a first embodiment. This ordered list 56 corresponds to addresses in an address LUT 58. Each field in the ordered list 56 contains information that indicates whether there is a possibility that a specified address, either a full or a prefixed address, exist in the address LUT 58.

An Internet address, as is known to those skilled in the art has four distinct components. These four distinct components may be converted to a single numerical value for ease of manipulation. To prepare the ordered list 56, at least one portion of the addresses in the address LUT 58 can be used to produce a set of lookup addresses 59. This portion may comprise distinct components of a part of the distinct components. In this first embodiment, an entire address including all components is used as a lookup address 59.

To prepare the ordered list 56, the PROVIDE ORDERED LIST step 54 first determines a smallest lookup address 60 and a largest lookup address 62 from the set of lookup addresses 59. This smallest lookup address (Smallest Address) 60 and largest lookup address (Largest_Address) 62 define limits of a range of lookup addresses 59. This step 54 allocates address existence fields to correspond to a predetermined number of lookup addresses 59 in the range. In this first embodiment, the predetermined number equals the number of discrete lookup addresses in the range. For the lookup addresses 59 in the address LUT 58, the number of fields required is given by the following equation:

Largest_Address−Smallest_Address+1

For the addresses in the address LUT 58, twenty-one fields are therefore allocated. Each field is preferably one memory bit in length and the ordered list 56 is preferably an array of bits.

After memory is allocated for the address existence fields, the address existence fields are initialized. For each lookup address 59 (Address), an index is calculated by subtracting the smallest lookup address 60 from the lookup address 59, i.e., the index is given by:

Address−Smallest_Address

The index in this example has a value of between 0 and twenty. The index is used to index into the ordered list 56 to access and set an address existence field corresponding to the lookup address 59. The setting of an address existence field signifies that a corresponding lookup address 59 exists in the address LUT 58. An address existence field that is clear signifies that a corresponding lookup address 59 does not exist in the address LUT 58 and a search in the address LUT 58 will result in a miss.

Upon completion of initialization of the ordered list 56, the sequence 50 proceeds to and loops around an INCOMING PACKET decision step 64 waiting for an incoming packet to arrive at the router 10, 12. If it is determined in this step 64 that an incoming packet has been received, the sequence 50 proceeds to an ADDRESS WITHIN RANGE step 65, where a specified address in the packet is determined to see if it is the range. If it is determined that the specified address is outside the range, the sequence 50 proceeds to a PERFORM DEFAULT OPERATION step 70, where the packet is processed according to a default operation for addresses that do not exist in the address LUT 58.

If, however, it is determined that the specified address in within the range, sequence proceeds to an INDEX ORDERED LIST step 66, where the ordered list 56 is indexed into using an index to access an address existence field corresponding a specified address in the received packet. The index is similarly determined as above based on the specified address (Specified Address) in the received packet. This index is given by:

Specified_Address−Smallest_Address

In this embodiment, the sequence 50 always proceeds to a CHECK ADDRESS EXISTENCE FIELD step 67, where the address existence field corresponding to the specified address is checked to determine if the field is set. If it is determined that the address existence field is clear, the sequence 50 proceeds to the PERFORM DEFAULT OPERATION step 70. If, however, it is determined in the CHECK ADDRESS EXISTENCE FIELD step 67 that the address existence field is set, the sequence 50 proceeds to a SEARCH ADDRESS LUT step 68, where any known algorithm may be used to search the address LUT 58 for the specified address. As is known to those skilled in the art, if the specified address is found in the address LUT 58, a prescribed operation corresponding to the specified address is perform on the received packet. From the PERFORM DEFAULT OPERATION step 70 and SEARCH ADDRESS LUT step 68, the sequence 50 returns to the INCOMING PACKET step 64 to await the arrival of another packet.

As is apparent to those skilled in the art, such an embodiment can be very memory inefficient. If there are only two addresses 59 in the address table 58 and these two addresses 59 are for example one hundred discrete addresses apart, a correspondingly large number of address existence fields would need to be allocated for ordered list 56.

Figure 4:
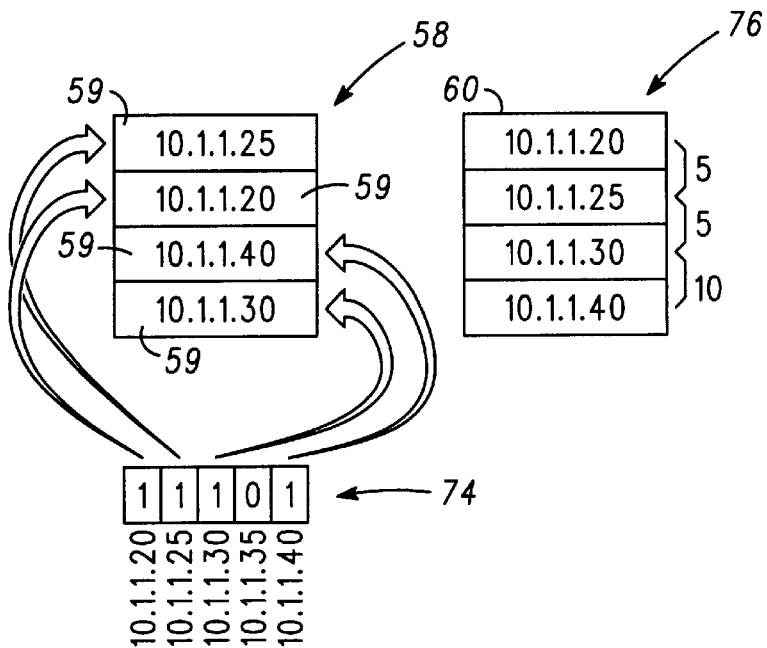
FIG. 4 is an illustration showing address existence fields according to a second embodiment that is provided for the same address lookup table in FIG. 3.

The memory efficiency can be improved by providing another ordered list according to a second embodiment. FIG. 4 shows an ordered list 74 associated with the address LUT 58. Only steps in which details differ from those in the first embodiment will be described. To prepare the ordered list 74, the PROVIDE ORDERED LIST step 54 sorts a set of lookup addresses 59, which in this embodiment consists of entire addresses in the address LUT 58, into a sorted list 76. The step 54 next determines the differences between consecutive pairs of addresses in the sorted list 76. For the addresses in the address LUT 58, the differences are five, five and ten as shown in FIG. 4. The greatest common divisor (GCD) of these differences is determined next. For the differences in FIG. 4, the GCD is found to be 5.

The step 54 allocates a number of address existence fields according to an equation:

$$\frac{Largest\_Address - Smallest\_address}{GCD} + 1$$

To initialize the address existence fields, an index is calculated for each address (Address) in the address LUT 58 using an equation:

$$\frac{Address - Smallest\_address}{GCD}$$

With the addresses in the address LUT 58, the equation yields a whole-number index in the range of 0 to 4. The index is used to index into the ordered list 74 for setting a corresponding field in the ordered list 74.

The INDEX ORDERED LIST step 66 in this embodiment calculates an index by using an equation:

$$\frac{Specified\_Address - Smallest\_address}{GCD}$$

If it is determined in this step 66 that there is a remainder when computing the above equation, the sequence 50 proceeds to the PERFORM DEFAULT OPERATION step 70 because the specified address is definitely not in the address LUT 58. If it is determined that there is no remainder, i.e., the numerator of the equation is divisible by the denominator of the equation, the sequence 50 continues in a similar manner as in the first embodiment by proceeding to the CHECK ADDRESS EXISTENCE FIELD step 67.

This second embodiment is more memory efficient compared to the first embodiment. This second embodiment reduces the number of address existence fields required in the first embodiment by the GCD. In other words, not all discrete lookup addresses need be represented in the ordered list 74; only a selected subset in the range of lookup addresses 59 is necessary. If however, the GCD is one, that is when there are two consecutive addresses in the address LUT 58, this second embodiment is no different than the first embodiment in the sense that it requires as many address existence fields.

To ensure that the GCD is of a reasonably high value, a third embodiment is provided. This third embodiment provides an ordered list in the PROVIDE ORDERED LIST step 54 that is derived from lookup addresses comprising a portion of the addresses in an address LUT.

Figure 5:
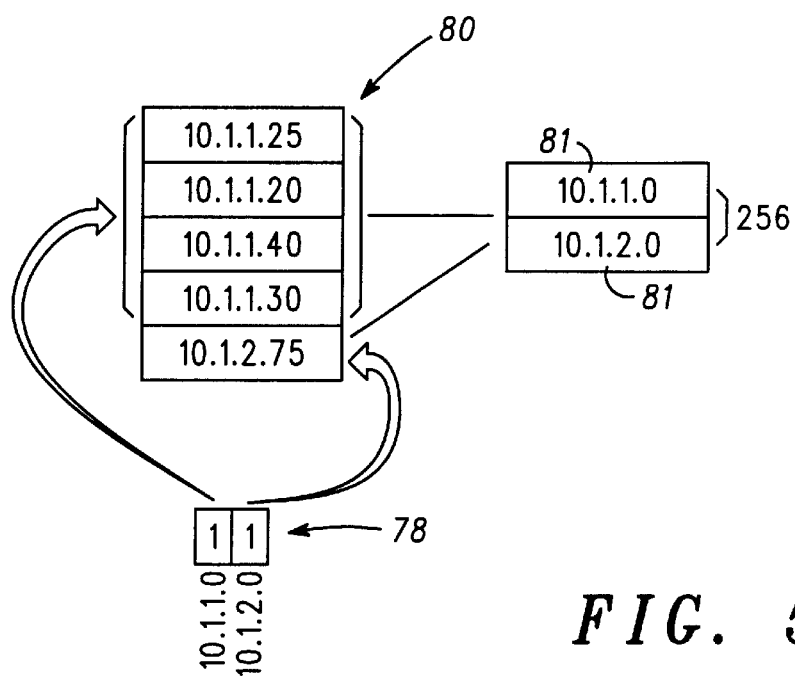
FIG. 5 is an illustration showing address existence fields according to a third embodiment.

FIG. 5 shows an ordered list 78 associated with an address LUT 80. To provide this ordered list 78 in the sequence 50, the PROVIDE ORDERED LIST step 54 additionally masks a portion of each address in the address LUT 80 to ignore for example, the eight least significant bits (LSB) of each address. In other words, a mask or prefix of 255.255.255.0 is applied to each address to produce a set of prefixed lookup addresses 81. For the addresses in the address LUT 80, there will be effectively two prefixed lookup addresses 81 in the set of prefixed lookup addresses. After masking, the PROVIDE ORDERED LIST step 54 sorts, calculates the differences and finds the GCD of the prefixed lookup addresses 81 in a similar manner as described in the second embodiment. This masking out of the eight LSB ensures a minimum GCD of 256. The equations in the second embodiment can be used for indexing the address existence fields in the ordered list 78 by replacing the full addresses with prefixed addresses.

This third embodiment significantly reduces the number of address existence fields required in an ordered list as compared to the second embodiment. However, there is a tradeoff in this third embodiment. The address existence fields in the ordered list no longer indicate a definite existence of an address in the address LUT 80. Take for example a specified address of 10.1.1.123. This specified address after masking would result in a prefixed address 81 of 10.1.1.0. The address existence field corresponding to this prefixed address having been set during initialization indicates that there is a possibility that the specified address 10.1.1.123 exists in the address LUT 80. A search of the address LUT 80 is then necessary to ascertain if this specified address exists in the address LUT 80. In this particular case where the specified address does not exist in the address LUT 80, a search in the address LUT 80 would result in a miss. The corresponding SEARCH ADDRESS LUT step 68 would necessarily need to include performing a default operation for such a miss result.

Although this third embodiment allows substantial savings in memory compared to the first and the second embodiments, the prefixed addresses of addresses in an address LUT 80 may still require that a significant amount of memory be allocated. Such an embodiment is not suitable for a system where the amount of memory available is limited.

The third embodiment is not limited to the use of a single mask. In fact, several masks may be used in preparing the ordered list 78. Correspondingly, a specified address of each incoming packet is masked using one of the masks before accessing the address existence fields in the ordered list 78. A mask with the highest number of 1's may be used first followed by masks with a decreasing number of 1's until all the masks are exhausted. With each masking, the resultant masked address is used to index the address existence fields to check if a corresponding field is set. A field that is set indicates that a specified address may be in an address LUT.

A fourth embodiment is now described for catering to a system with a limited memory. This fourth embodiment uses hashing to reduce the number of fields required in an ordered list.

Figure 6:
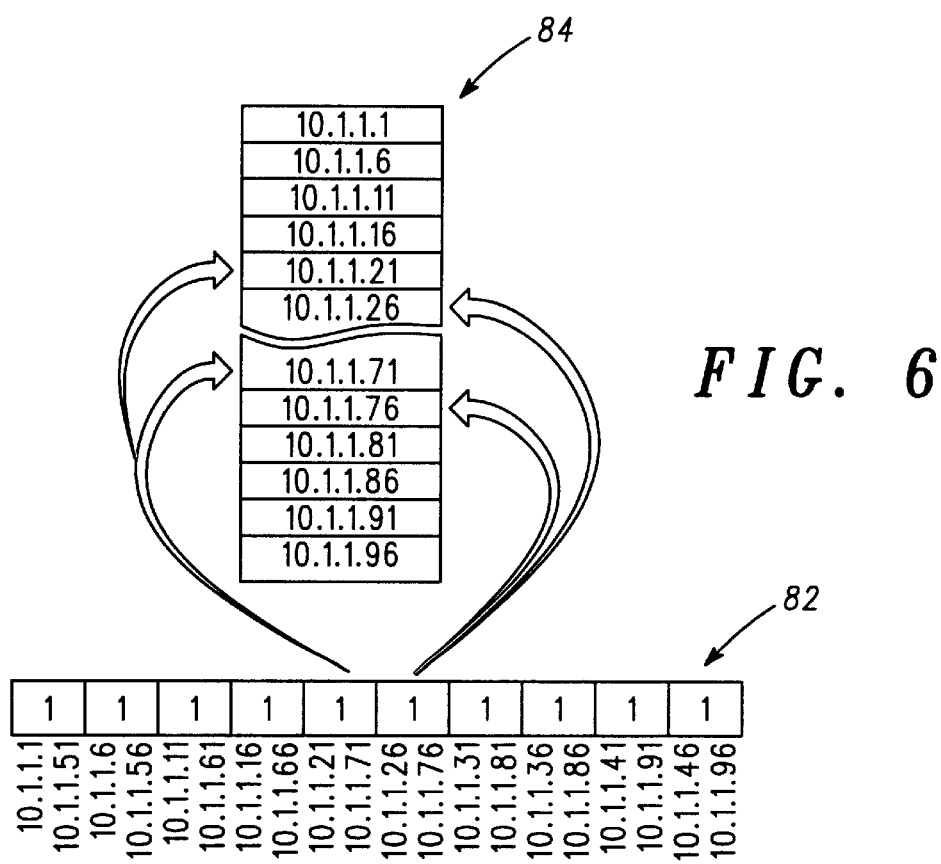
FIG. 6 is an illustration showing address existence fields according to a fourth embodiment which uses a hashing scheme to reduce the number of address existence fields required.

FIG. 6 shows an ordered list 82 associated with an address LUT 84. To provide this ordered list 82 in the sequence 50, the PROVIDE ORDERED LIST step 54 essentially allocates address existence fields in a similar manner as that in the second embodiment by additionally taking into account an available memory size, for example 10 bits. For ease of illustration, consider the addresses 10.1.1.1, 10.1.1.6, . . . 10.1.1.41, 10.1.1.46, 10.1.1.51, . . . 10.1.1.91, 10.1.1.96 in the address LUT 84 to be equivalent to simplified addresses 100, 105, . . . 140, 145, 150, . . . , 190, 195.

With differences of these addresses having a GCD of 5, twenty fields will be required in an ordered list according to the second embodiment. In this example, there are only 10 bits of memory available and these 10 bits of memory is only sufficient to represent the first ten addresses in the range of 100–145. The calculation of an index value will have to take into consideration the number of available bits. The equation in the second embodiment for calculating an index will have to be modified to:

$$\left(\frac{Address - \text{Smallest\_address}}{GCD}\right) MODULUS\,(No.\_of\_bits)$$

An index obtained by computing the above equation will fall within a range 0–9 for accessing the 10-bit memory. An address is said to be hashed to an index within the range 0–9 for accessing the 10-bit memory. Therefore, using such a hashing scheme, each bit in the ordered list 82 may correspond to more than one address. For the example in FIG. 6, each bit corresponds to two addresses. When an address existence field is set, the probability of locating a specified address in the address LUT 84 is reduced to 50% as compared to a 100% in the second embodiment. Each address existence field is a hash bucket of size two in this case. If the number of lookup addresses is increased without increasing the number of fields, the hash bucket size increases and the probability of getting a hit in the address LUT 84 decreases accordingly.

Although this fourth embodiment is not as efficient in reducing the number of misses in searching an address LUT, it can be used on a system where there is insufficient memory to support the first three embodiments. This fourth embodiment has the advantage of flexibility in terms of memory requirement and is therefore adaptable to be used on different routers with different amount of available memories. Moreover, the number of bits of available memory may be defined by a user or automatically adjusted to optimize the efficiency of the method to suit different operating environments. For example, if address existence fields of an ordered list indicate too low a probability factor that results in too high a number of misses while searching the address LUT, the number of fields may be increased accordingly to reduce the number of misses. Such a hashing scheme may be applied to the third embodiment for hashing prefixed addresses.

In the embodiments described so far, the goal was focused on reducing the number of address existence fields in an ordered list at the expense of percentage of hits when searching an address LUT.

Figure 7:
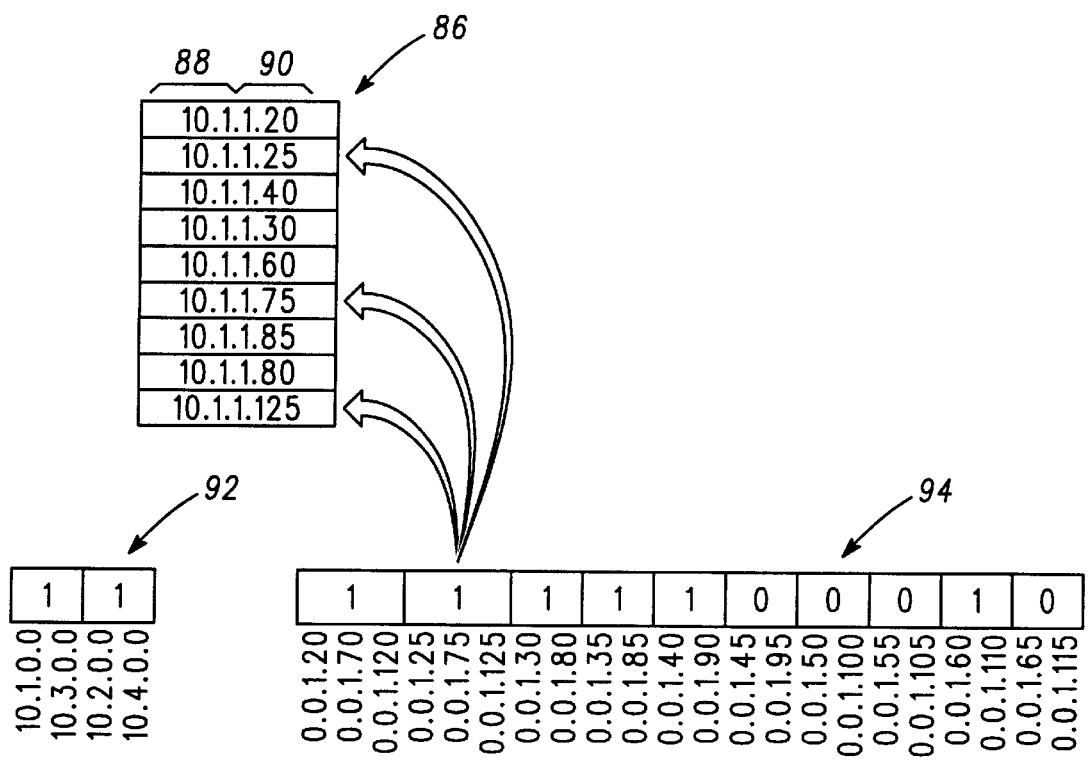
FIG. 7 is an illustration showing address existence fields according to a fifth embodiment which uses two levels of hashing to reduce the number of address existence fields required.

In a fifth embodiment, attention is switched to increasing a hit-to-miss ratio when searching an address LUT. This fifth embodiment also uses hashing but instead of one-level of hashing as described in the fourth embodiment, multiple levels of hashing, preferably two levels, are used. FIG. 7 shows two ordered lists 92, 94 and an associated address LUT 86. In the PROVIDE ORDERED LIST step 54 of the sequence 50, each address in the address LUT 86 is preferably separated into two portions—a first prefixed portion 88 and a second masked portion 90. The first prefixed portion 88 may include a component consisting of an arbitrary number of most significant bits (MSB) of an address, for example 16 MSB in this example. The second masked portion 90 preferably includes the remaining LSB of an address, which in this example, is the 16 LSB that is non-overlapping with the first prefixed portion 88. The two ordered lists 92, 94 are initialized, one for hashing the first prefixed portion 88 of the addresses in the address LUT 86 and the second for hashing the second masked portion 90 of the addresses.

When indexing the ordered lists 92, 94 in the INDEX ORDERED LIST step 66 to determine if a search of the address LUT 86 is necessary, the first prefixed portion 88 of a specified address is used to hash into the first ordered list 92. If a corresponding field in the first ordered list 92 is set, the second portion 90 of the specified address is then used to hash into the second ordered list 94. If a field in this second ordered list 94 is set, the sequence 50 proceeds to search the address LUT 86 in the SEARCH ADDRESS LUT step 68. If the field in the first ordered list 92 or the second ordered list 94 is clear, the sequence 50 proceeds to the default operation step 70.

This fifth embodiment by including a two level hashing scheme is able to reduce the number of misses when searching an address LUT.

Advantageously, the provision of an ordered list containing address existence fields allows the method to quickly determine if a search of a specified address in an address LUT is necessary. Consequently, by reducing the number of searches of an address LUT, precious processor time may be conserved.

Although the invention has been described with reference to preferred embodiments, it is to be understood that the invention is not restricted to the embodiments described herein. For example, it is well known that a longest-match algorithm is used in routers for matching address prefixes. The method according to the third and fifth embodiment may be modified to include such a longest-match algorithm. For example, in the fifth embodiment, a shortest prefix amongst a group of prefixes of different lengths may be used to prepare the first ordered list 92. If an address existence field in the first ordered list indicates that such a prefix exists in an address LUT, a search in the LUT is conducted regardless of the outcome of indexing into the second ordered list 94.

We claim:

1. A method for determining if it is necessary to perform a search for a specified address in an address lookup table (LUT) containing a plurality of addresses, said method comprising:
   providing at least one ordered list of address existence fields associated with lookup addresses obtained from at least one portion of said plurality of addresses;
   indexing into said at least one ordered list to access at least one address existence field associated with a corresponding portion of said specified address; and
   checking said at least one address existence field to determine if a search of said specified address in said address LUT is necessary;
   wherein said providing at least one ordered list includes:
   determining a smallest and a largest lookup address of lookup addresses that define limits of a range of lookup addresses;
   allocating address existence fields for a predetermined number of said lookup addresses in said range; and
   initializing address existence fields corresponding to said range of lookup addresses to indicate existence of corresponding addresses in said address LUT, wherein indexing into said at least one ordered list includes indexing into said at least one ordered list if said specified address has a corresponding address portion in said range.

2. The address search method according to claim 1, wherein said at leas one portion of said plurality of addresses includes all components of said addresses.

3. The address search method according to claim 1, wherein said at least one portion of said plurality of addresses includes a masked portion of said addresses.

4. The address search method according to claim 3, wherein said masked portion of said addresses includes a prefix portion of said address.

5. The address search method according to claim 1, wherein said masked portion of said fields includes allocating address existence fields for discrete lookup address in said range.

6. The address search method according to claim 1, wherein allocating address existence fields includes allocating address existence fields for a selected subset of said lookup addresses in said range.

7. The address search method according to claim 6, wherein said selected subset of lookup addresses in said range includes lookup addresses that have a difference with the smallest lookup address that is divisible by a greatest common divisor obtained from differences between consecutive pairs of sorted lookup addresses.

8. The address search method according to claim 1, wherein allocating address existence fields includes:
   allocating a predetermined number of address existence fields; and
   hashing lookup addresses in said set of lookup addresses to said predetermined number of address existence fields.

9. The address search method according to claim 8, wherein said at least one portion of said addresses includes a masked portion of said addresses.

10. The address search method according to claim 9, wherein said masked portion of said addresses includes a first prefix portion and wherein providing at least one ordered list includes providing a first ordered list associated with a first set of prefixed addresses.

11. The address search method according to claim 10, wherein providing at least one ordered list further includes providing a second ordered list associated with addresses masked with a second mask.

12. The address search method according to claim 11, wherein sa second mask is non-overlapping with said first prefix portion and wherein indexing into said at least one ordered list includes first indexing into said first ordered list and subsequently indexing into said second ordered list if an address existence field obtained from said first ordered list indicates further indexing is necessary, and wherein checking said at least one address existence field includes checking address existence fields obtained from both said first and second ordered list and said method further includes proceeding with a search of said specified address in said address LUT if at least one of said obtained address existence fields indicates that a search is necessary.

13. The address search method according to claim 8, wherein said predetermined number of address existence fields is adjustable.

14. A computing node comprising:

a processor;

a memory operatively coupled to said processor;

wherein said processor executes program instructions stored in said memory in response to an arrival of a packet with a specified address at the computing node for determining if it is necessary to perform a search for said specified address in an address lookup table (LUT) containing a plurality of addresses in said memory by:

providing at least one ordered list of address existence fields associate with lookup addresses obtained from at least one portion of said addresses;

indexing into said at least one ordered list to access at least one address existence field associated with a corresponding portion of said specified address; and checking said at least one address existence field to determine if a search of said specified address in said address LUT is necessary;

wherein said providing at least one ordered list includes:

determining a smallest and a largest lookup address of lookup address s that define limits of a range of lookup addresses;

allocating address existence fields for a predetermined number of said lookup addresses in said range; and initializing address existence fields corresponding to said range of lookup addresses to indicate existence of corresponding addresses in said address LUT, wherein indexing into said at least one ordered list includes indexing into said at least one ordered list if said specified address has a corresponding address portion in said range.

\* \* \* \* \*